R. A. McCLURE.
MONORAIL TRACTION WHEEL.
APPLICATION FILED APR. 26, 1916.

1,241,748.

Patented Oct. 2, 1917.

WITNESSES:

INVENTOR
Royal A. McClure
BY
ATTORNEY

UNITED STATES PATENT OFFICE.

ROYAL A. McCLURE, OF SEATTLE, WASHINGTON, ASSIGNOR TO UNIVERSAL ELEVATED RAILWAY COMPANY, INCORPORATED, OF SEATTLE, WASHINGTON.

MONORAIL TRACTION-WHEEL.

1,241,748.   Specification of Letters Patent.   Patented Oct. 2, 1917.

Application filed April 26, 1916. Serial No. 93,593.

*To all whom it may concern:*

Be it known that I, ROYAL A. MCCLURE, a citizen of the United States, and a resident of Seattle, in the county of King and State of Washington, have invented certain new and useful Improvements in Monorail Traction-Wheels, of which the following is a full, true, and exact specification.

This invention relates to mono-rail traction wheels and has for its principal object to provide an improved form of mono-rail wheel for traction purposes for use in mono-rail cars; to provide a traction wheel having movable tires; to provide a traction wheel in which a pair of similar tires are used one on either side of the center line of the wheel; to provide a traction wheel in which the outer portion of the wheel is used as a field for the inner of which constitutes the armature of a motor. In mono-rail trucks it is desirable on account of sharp curves and for other reasons to have several treads on the traction wheels. For this reason I have devised the double tire idea which is used in this application. The advantages of a self contained practice power plant all within the traction wheel will be apparent from a stand point of economy of space and weight.

Other objects will appear as my invention is more fully explained in the following specification, illustrated in the accompanying drawings and pointed out in the appended claims.

Figure 1:
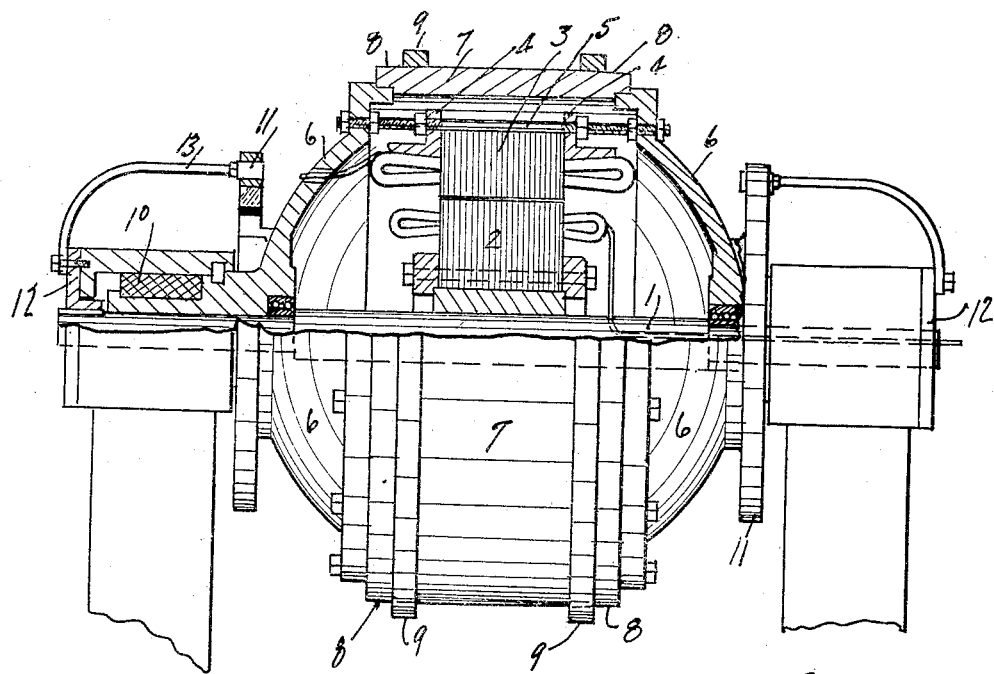
Figure 2:
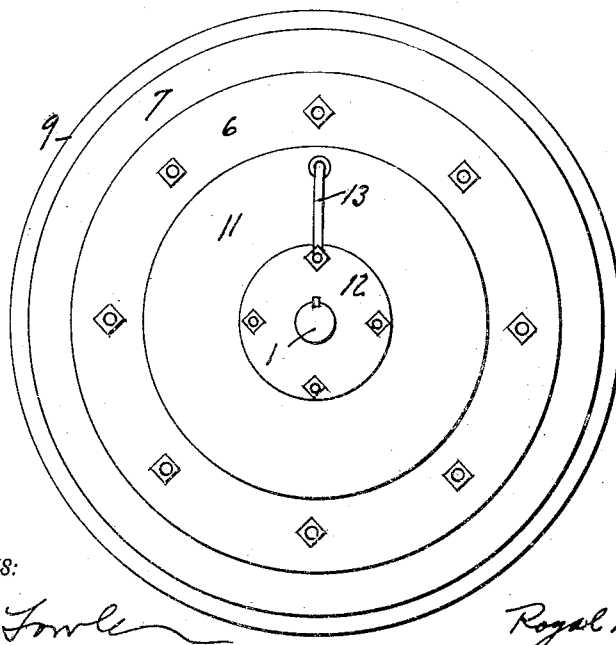

In the drawings, Figure 1 is a side elevation of my device with the upper portion in sections. Fig. 2 is an end elevation of same.

Referring more particularly to the drawings, numeral 1 indicates a separate shaft upon which a three phase induction motor without armature is mounted. The motor comprises inner field 2 which is secured to the shaft 1 and outer field 3 which is secured to the traction or tread portion of the wheel as will be explained later. The revolving field 3 is clamped together by means of clamp rings 4 and bolts 5. End flanges 6 are mounted upon shaft 1 and are revoluble therewith. An outer rim 7 is placed between the members 6 and securely held in place by means of the bolts 5 which pass through the member 6 and are secured by nuts on the outer ends. The end portions of rim 7 are slightly tapered as at 8 to provide surfaces upon which tires 9 may be forced by means of hydraulic pressure or otherwise. The desirability of removable tires is determined when it is considered that the tires rapidly and frequently need returning and replacing. The connection for the member 2 is taken out through the center of the shaft 1 while the connection for the field 3 passes out through the end of the squirrel cage. End members 6 are provided with bearings 10 which take the load and transfer it to the frame of the truck. Insulated slip rings are provided on the ends of members 6. The slip rings are stationary while the inner portion revolves with the traction wheel. End flanges 12 are secured one to either end of shaft 1. A rod 13 connects the slip rings to the flanges 12. My traction wheel is adapted to run upon a flat rail and in round curves there will be much less slip and abrasion by using twin tires 9 than there would providing a single tire was used. The advantages of removable treads or tires 9 will be more readily understood when it is considered that tire material is generally of a much higher grade of material than is used for the body of the wheel. This facilitates the maintenance charges of the wheels. The efficiency of my motor and wheel should be comparatively high on account of no loss in transmission of power between the motor and the wheel.

While I have shown a particular form of embodiment of my invention, I am aware that many minor changes therein will readily suggest themselves to others skilled in the art without departing from the spirit and scope of the invention and I therefore desire to avoid being limited to the exact form shown and described.

Having described my invention, what I claim as new and desire to protect by Letters Patent, is—

1. In a mono-rail system, the combination of a traction wheel including a tapered outer rim, a pair of flangeless tires removably secured to the tapered portion of said rim and positioned in parallel spaced relation to each other, end flanges revolubly mounted on a central shaft and secured to said rim.

2. In a mono-rail traction wheel which includes stationary motor fields secured to a shaft and revoluble motor fields secured to clamp rings, the combination of an outer rim with tapered ends, spherical end flanges revolubly mounted on said shaft and supporting said rim, the said rim holding the flanges in spaced relation to each other, bolts connecting the said flanges and clamp rings together, whereby the flanges and rim and revoluble fields are fastened together, and a pair of similar tapered tires, one on either tapered end of said outer rim.

ROYAL A. McCLURE.

Copies of this patent may be obtained for five cents each, by addressing the "Commissioner of Patents, Washington, D. C."